(12) United States Patent
Lin et al.

(10) Patent No.: US 8,244,707 B2
(45) Date of Patent: *Aug. 14, 2012

(54) METHOD AND APPARATUS FOR PROVIDING SUPPLEMENTAL VIDEO CONTENT FOR THIRD PARTY WEBSITES

(75) Inventors: Andrew Cheng-min Lin, Los Angeles, CA (US); Bradley J. Suter, Santa Monica, CA (US)

(73) Assignee: Hulu LLC, Los Angeles, CA (US)

( * ) Notice: Subject to any disclaimer, the term of this patent is extended or adjusted under 35 U.S.C. 154(b) by 320 days.

This patent is subject to a terminal disclaimer.

(21) Appl. No.: 12/688,366

(22) Filed: Jan. 15, 2010

(65) Prior Publication Data

US 2011/0179010 A1 Jul. 21, 2011

(51) Int. Cl.
*G06F 17/30* (2006.01)

(52) U.S. Cl. ......................................... 707/706

(58) Field of Classification Search .................. 707/706
See application file for complete search history.

(56) References Cited

U.S. PATENT DOCUMENTS

| | | | | |
|---|---|---|---|---|
| 6,172,677 | B1 * | 1/2001 | Stautner et al. | 715/716 |
| 6,177,931 | B1 * | 1/2001 | Alexander et al. | 725/52 |
| 6,304,653 | B1 * | 10/2001 | O'Neil et al. | 379/265.09 |
| 6,606,644 | B1 * | 8/2003 | Ford et al. | 709/203 |
| 6,756,997 | B1 * | 6/2004 | Ward et al. | 715/716 |
| 6,993,535 | B2 * | 1/2006 | Bolle et al. | 1/1 |
| 7,100,069 | B1 * | 8/2006 | Hickman et al. | 714/4.12 |
| 7,127,500 | B1 * | 10/2006 | Hellman et al. | 709/219 |
| 7,136,875 | B2 * | 11/2006 | Anderson et al. | 1/1 |
| 7,236,969 | B1 * | 6/2007 | Skillen et al. | 707/706 |
| 7,430,528 | B2 * | 9/2008 | Perkowski | 705/27.2 |
| 7,516,094 | B2 * | 4/2009 | Perkowski | 705/14.73 |
| 7,533,040 | B2 * | 5/2009 | Perkowski | 705/26.62 |
| 7,536,324 | B2 * | 5/2009 | Perkowski | 705/26.61 |
| 7,602,846 | B1 * | 10/2009 | Wu et al. | 375/240.12 |
| 7,653,627 | B2 * | 1/2010 | Li et al. | 707/999.007 |
| 7,711,598 | B2 * | 5/2010 | Perkowski | 705/14.51 |
| 7,844,492 | B2 * | 11/2010 | Perkowski et al. | 705/14.4 |
| 7,844,603 | B2 * | 11/2010 | Lucovsky et al. | 707/728 |
| 7,853,622 | B1 * | 12/2010 | Baluja et al. | 707/803 |
| 8,001,187 | B2 * | 8/2011 | Stochosky | 709/205 |
| 8,028,233 | B1 * | 9/2011 | Florschuetz et al. | 715/716 |
| 8,065,201 | B2 * | 11/2011 | Perkowski | 705/27.1 |
| 8,099,317 | B2 * | 1/2012 | Moukas et al. | 705/7.29 |
| 8,122,019 | B2 * | 2/2012 | Lucovsky et al. | 707/728 |
| 2002/0032603 | A1 * | 3/2002 | Yeiser | 705/14 |
| 2002/0035615 | A1 * | 3/2002 | Ullman et al. | 709/218 |
| 2002/0038383 | A1 * | 3/2002 | Ullman et al. | 709/245 |
| 2002/0042813 | A1 * | 4/2002 | Ullman et al. | 709/203 |
| 2002/0100043 | A1 * | 7/2002 | Lowthert et al. | 725/36 |
| 2002/0124253 | A1 * | 9/2002 | Eyer et al. | 725/34 |
| 2002/0188621 | A1 | 12/2002 | Flank et al. | |

(Continued)

*Primary Examiner* — Mark A Radtke

(74) *Attorney, Agent, or Firm* — Connolly Bove Lodge & Hutz LLP; Jonathan Jaech

(57) ABSTRACT

A method, apparatus and article of manufacture for providing supplemental video content for third party websites is disclosed. In one embodiment, coded instructions are transmitted from a content enhancement server to a host server, for incorporation into the webpage source code. The host server is controlled by a first entity and the content enhancement server is controlled by a second entity commercially distinct from the first entity. Keywords are generated by execution of the coded instructions in the webpage received in the client computer from the host server, and the keywords are sent to a content enhancement server, which generates supplemental substantive video content information for transmission to the client.

15 Claims, 11 Drawing Sheets

U.S. PATENT DOCUMENTS

| | | | |
|---|---|---|---|
| 2002/0188699 A1* | 12/2002 | Ullman et al. | 709/219 |
| 2003/0018745 A1* | 1/2003 | McGowan et al. | 709/217 |
| 2003/0046338 A1* | 3/2003 | Runkis | 709/203 |
| 2003/0065719 A1* | 4/2003 | Ullman et al. | 709/203 |
| 2003/0226150 A1* | 12/2003 | Berberet et al. | 725/94 |
| 2003/0232648 A1* | 12/2003 | Prindle | 463/40 |
| 2004/0030759 A1* | 2/2004 | Hidary et al. | 709/218 |
| 2004/0045040 A1 | 3/2004 | Hayward | |
| 2004/0080528 A1 | 4/2004 | Rand et al. | |
| 2004/0116183 A1* | 6/2004 | Prindle | 463/42 |
| 2005/0004985 A1* | 1/2005 | Stochosky | 709/205 |
| 2005/0004995 A1* | 1/2005 | Stochosky | 709/219 |
| 2005/0193014 A1 | 9/2005 | Prince | |
| 2005/0198068 A1 | 9/2005 | Mukherjee et al. | |
| 2006/0143675 A1* | 6/2006 | Willis et al. | 725/114 |
| 2006/0160570 A1* | 7/2006 | Kamarainen | 455/557 |
| 2007/0005524 A1* | 1/2007 | Iwachin | 706/15 |
| 2007/0121846 A1* | 5/2007 | Altberg et al. | 379/114.13 |
| 2007/0219859 A1* | 9/2007 | Huntington | 705/14 |
| 2007/0244900 A1 | 10/2007 | Hopkins et al. | |
| 2008/0021778 A1* | 1/2008 | Perkowski et al. | 705/14 |
| 2008/0052278 A1* | 2/2008 | Zlotin et al. | 707/3 |
| 2008/0072250 A1* | 3/2008 | Osorio et al. | 725/34 |
| 2008/0114648 A1* | 5/2008 | Chen et al. | 705/14 |
| 2008/0165960 A1* | 7/2008 | Woo | 380/201 |
| 2008/0221915 A1* | 9/2008 | Berkowitz et al. | 705/1 |
| 2009/0030802 A1* | 1/2009 | Plotnick et al. | 705/14 |
| 2009/0119169 A1* | 5/2009 | Chandratillake et al. | 705/14 |
| 2009/0144154 A1* | 6/2009 | Schein | 705/14 |
| 2009/0150920 A1* | 6/2009 | Jones | 725/23 |
| 2009/0175490 A1* | 7/2009 | Price | 382/100 |
| 2009/0216737 A1 | 8/2009 | Dexter | |
| 2010/0107093 A1* | 4/2010 | Perkowski | 715/763 |
| 2010/0158391 A1* | 6/2010 | Cunningham et al. | 382/209 |
| 2011/0004525 A2* | 1/2011 | Byrne | 705/14.67 |
| 2011/0078006 A1* | 3/2011 | Archer | 705/14.23 |
| 2011/0078753 A1* | 3/2011 | Christianson et al. | 725/109 |
| 2011/0179357 A1* | 7/2011 | Lin et al. | 715/733 |
| 2011/0313856 A1* | 12/2011 | Cohen et al. | 705/14.49 |

* cited by examiner

```
<html><!-- #BeginTemplate "Templates/main.dwt" -->
<head>
<!-- #BeginEditable "doctitle" -->
<title>The Eastern Sierra</title>
<!-- #EndEditable -->
<meta http-equiv="Content-Type" content="text/html; charset=iso-8859-1">
<meta name="keywords" content="mountains, fishing, eastern sierra, skiing, mammoth, US395">
<meta name="description" content="The Eastern Sierra is an adult playground for the outdoorsperson.">
<link rel="stylesheet" href="main.css">
/*
...

<div id='relevant-contnent' class="post-body entry-content">
The Eastern Sierra has some of the best skiing available anywhere in the U.S. Mammoth Mountain is the largest ski resort in the West,   802
and is typically open from October through June, boasting one of the longest ski seasons in the country. Nearby June Mountain offers
a no-hassle alternative with plenty of skiing and very few crowds.</div>

...

</script>
</body>
</html>
```

```
<html><!-- #BeginTemplate "Templates/main.dwt" -->
<head>
<!-- #BeginEditable "doctitle" -->
<title>The Eastern Sierra</title>
<!-- #EndEditable -->
<meta http-equiv="Content-Type" content="text/html; charset=iso-8859-1">
<meta name="keywords" content="mountains, fishing, eastern sierra, skiing, mammoth, US395">
<meta name="description" content="The Eastern Sierra is an adult playground for the outdoorsperson.">
<link rel="stylesheet" href="main.css">
/*
```

...

```
<div id='relevant-contnent' class='post-body entry-content'>
The Eastern Sierra has some of the best skiing available anywhere in the U.S. Mammoth Mountain is the largest ski resort in the West,   ⎫
and is typically open from October through June, boasting one of the longest ski seasons in the country. Nearby June Mountain offers  ⎬ 802
a no-hassle alternative with plenty of skiing and very few crowds.</div>                                                                ⎭

<embed width="320" height="266"                                                                                                    ⎫
src="http://contentenhancementserver.com/contextSensitiveVideoPlayer.swf"                                                          ⎬ 902
type="application/x-shockwave-flash" targetContent="relevant-content"></embed>                                                     ⎭
```

...

```
</script>
</body>
</html>
```

FIG. 9

METHOD AND APPARATUS FOR PROVIDING SUPPLEMENTAL VIDEO CONTENT FOR THIRD PARTY WEBSITES

BACKGROUND OF THE INVENTION

1. Field of the Invention

The present invention relates to systems and methods for providing streaming media to users, and in particular, to a system and method for presenting a search utility in embedded video.

2. Description of the Related Art

The dissemination and playback of media programs has undergone substantial changes in the past decade. Previously, media programs were disseminated either by analog broadcast (conventional, satellite, or cable) or by dissemination of films to movie theaters.

These traditional dissemination and playback means remain in use after the advent of digital technology. However, digital technologies have had a profound effect on the dissemination and playback of media programs.

First, digital technology permitted the use of digital video recorders (DVRs). DVRs, while similar in function to standard analog video cassette recorders (VCRs), provide a number of additional useful functions including live pause, the ability to record one program while playing back another, and the integration of the electronic program guides with DVR functionality (so that the recordation of media programs could be scheduled far in advance).

Second, digital technology also permitted the dissemination and playback of media programs via the Internet, and with improved signal processing and more and more households with high-speed Internet access (e.g. DSL, fiber, satellite), this method of dissemination and playback has become competitive with traditional means. Dissemination of media programs via the Internet may occur either by simple downloading, progressive downloading or streaming, and may be accomplished via dial-up, DSL, ADSL, cable, T1, or other high speed internet connections.

With simple downloading, a media file having the media program is downloaded to the user's computer, where it can be played back. Playback of the media file cannot commence until the entire file is downloaded, since the bytes of the media file in any convenient order, and not necessarily from the beginning to the end.

With progressive downloading, is similar to simple downloading, but instead of downloading portions of the media file in any convenient order, progressive downloading downloads the media file from the beginning and continues downloading the file sequentially and consecutively until the last byte. This typically permits the playback of the media program before the entire media file has been downloaded, so long as the media player has downloaded enough information to support playback. However, at any particular time during progressive downloading, some portions of the file (e.g. the portions at the end of the file) are not immediately available for playback. Playback is often delayed by slow Internet connections and is also often choppy and/or contains a high likelihood of stopping after only a few seconds. Downloaded material is thereafter stored on the end-user computer. Progressive downloading is typically performed by a web server.

One of the disadvantages of a progressive downloading is that the entity transmitting the data (the web server) simply pushes the data to the client as fast as possible. It may appear to be "streaming" the video because the progressive download capability of many media players allows playback as soon as an adequate amount of data has been downloaded. However, the user cannot fast-forward to the end of the file until the entire file has been delivered by the web server. Another disadvantage with progressive downloading is that the web server does not make allowances for the data rate of the video file. Hence if the network bandwidth is lower than the data rate required by the video file, the user will have to wait a period of time before playback can begin. If playback speed exceeds the data transfer speed, playback may be paused for a period of time while additional data is downloaded. However, the video playback quality will be higher when the playback occurs because of the higher data rate. For example, if a 100 kbps video file can be delivered over a 56 kbps modem, the video will be presented at the 100 kbps rate, but there may be periods when playback will be paused while additional video data is downloaded. The video data is typically downloaded as a temporary file in its entirety.

Web servers typically use HTTP (hypertext transport protocol) on top of TCP (transfer control protocol) to transfer files over the network. TCP, which controls the transport of data packets over the network, is optimized for guaranteed delivery of data, not speed. Therefore, if a browser senses that data is missing, a resend request will be issued and the data will be resent. In networks with high delivery errors, resend requests may consume a large amount of bandwidth. Since TCP is not designed for efficient delivery of adequate data or bandwidth control (but rather guaranteed delivery of all data), it is not preferred for the delivery of video data in all applications.

Streaming delivers media content continuously to a media player and media playback occurs simultaneously. The end-user is capable of playing the media immediately upon delivery by the content provider. Traditional streaming techniques originate from a single provider delivering a stream of data to a set of end-users. High bandwidths and central processing unit (CPU) power are required to deliver a single stream to a large audience, and the required bandwidth of the provider increases as the number of end-users increases.

Unlike progressive downloading, streaming media is delivered on-demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Streaming media is often delivered from one or more dedicated streaming media servers.

A streaming media server is a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player. Unlike the web server, the streaming media sever communicates with the media server using control messages and data messages to adjust to changing network conditions as the video is played. These control messages can include trick play functions such as fast forward, fast reverse, pausing, or seeking to a particular part of the file. Since a streaming media server transmits video data only as needed and at the rate that is needed, precise control over the number of streams served can be maintained. Unlike the case with progressive downloading, the viewer will not be able to view high data rate videos over a lower data rate transmission medium. However, streaming media servers (1) provide users random access to the video file, (2) allows monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming media servers may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth.

Typically, progressively downloaded media is transmitted to the user computer at a rate that is faster than playback. The media program player buffers this data, and may indicate how much of the media program has been buffered by providing an indicator, usually as a part of a "progress bar." A control is often provided that allows the user to go to any point in the program that has already been buffered by selecting the control and moving it to a different location along the progress bar. This allows the user to randomly access any buffered portion of the media program.

Streaming media players do not rely on buffering to provide random access to any point in the media program. Instead, this is accomplished through the use of control messages transmitted from the media player to the streaming media server.

Streaming media and progressive downloading allows the media to be played back via media players that can be embedded in the webpages of third parties. Such webpages may also include links to media programs (whether batched, progressively downloaded, or streamed). For example, a first entity such as search portal GOOGLE (www.google.com) may embed a media player in one of their hosted webpages that is provided in response to a search query. Other examples of embedded media players include commercial entities such as AMAZON (www.amazon.com), who may embed a media player in one of their hosted webpages and a blogger, who may embed a media program player in their hosted webpages to playback a video of interest to the readers.

However, embedding video or even providing links to media programs, particularly when obtained from sources other than the host of the underlying webpage can be problematic. If the webpage host wishes to embed video that is relevant to the substantive content presented in the webpage, the host's webmaster must perform a search to identify relevant video and code the link to the video within the webpage. For example, if the substantive content of the webpage includes information regarding a particular geographical locale such as the Eastern Sierra, the webmaster may perform a search for media programs relevant or related to the Eastern Sierra. Such media programs may include skiing videos, fishing videos or bicycling videos. The webmaster may then incorporate links to these media programs or embed these programs in the hosted webpage using appropriate HTML source. This technique has a number of disadvantages.

First, although a webmaster should be aware of the status of links to videos under the webmaster's control (e.g. videos offered at the same website), the same cannot be said for links to videos at third party websites. Such links can appear and disappear quickly and without notice. It is not at all unusual for a link to a video to be broken only days after the video is first available, nor is it unusual for links to new and perhaps preferable videos to appear in short order. If the host of a webpage were to manually embed videos into the webpage by altering the HTML source, the webmaster would be required to perform searches for new video links and to verify that the currently defined links remain valid as often as every few days. While this might not be a particularly onerous task for a website host with a full time webmaster, it is especially onerous for smaller website hosts.

Second, coding video links into webpages is only feasible with static webpage, that is, webpages that present the same content regardless of context. Webpages that are responsive to user input (such as search queries) or other information (such as information obtained from cookies and the like) present different content depending on factors which cannot be divined in advance. For such webpages, it is not feasible to provide embedded video that is responsive to the substantive content provided in the webpage itself. For example, if a user performs a search of the Internet for websites using "Eastern Sierra" for the query, the user will be presented with a number of potential websites that include content relevant to the Eastern Sierra. These results may also be modified in accordance with the information available in the user's cookies. Since the content of the response to the search query may change over time and cannot be divined in advance, it is difficult or impossible to provide a static link to such media programs in the search results.

What is needed is a system and method for adaptively supplementing the substantive content of a webpage using media program content available from third parties. The present invention satisfies this need.

SUMMARY OF THE INVENTION

To address the requirements described above, a method, apparatus and article of manufacture for providing supplemental substantive video content on a webpage hosted by a host server and downloaded and viewed by a client computer. In one embodiment, the method comprises the steps of transmitting coded instructions from a content enhancement server to the host server, the coded instructions for incorporation into the webpage source code, wherein the host server is controlled by a first entity and the content enhancement server is controlled by a second entity commercially distinct from the first entity, receiving keywords from the client computer, the keywords generated by execution of the coded instructions in the webpage received in the client computer from the host server, generating supplemental substantive video content information from the keywords in the content enhancement server, the supplemental substantive video content information describing video content supplementing the substantive content of the webpage, and transmitting the supplemental substantive content information from the content enhancement server to the to the client computer for presentation in the webpage by the client computer.

In another embodiment, the system comprises a content enhancement server, having a content enhancement processor and a content enhancement server memory storing content enhancement instructions. The instructions include instructions for transmitting coded instructions from the content enhancement server to the host server, wherein the coded instructions are for incorporation into webpage source code, wherein the host server is controlled by a first entity and the content enhancement server is controlled by a third entity commercially distinct from the first entity, receiving keywords from the client computer, the keywords generated by execution of the coded instructions received in the client computer from the host server, and generating supplemental substantive video content information from the keywords in the content enhancement server, the supplemental substantive video content information describing video content supplementing the substantive content of the webpage; and transmitting the supplemental substantive content information from the content enhancement server to the to the client computer for presentation in the webpage by the client computer.

BRIEF DESCRIPTION OF THE DRAWINGS

Referring now to the drawings in which like reference numbers represent corresponding parts throughout:

FIG. 8 is a diagram showing exemplary webpage source code;

FIG. 9 is a diagram presenting webpage source code modified to include an embedded video.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
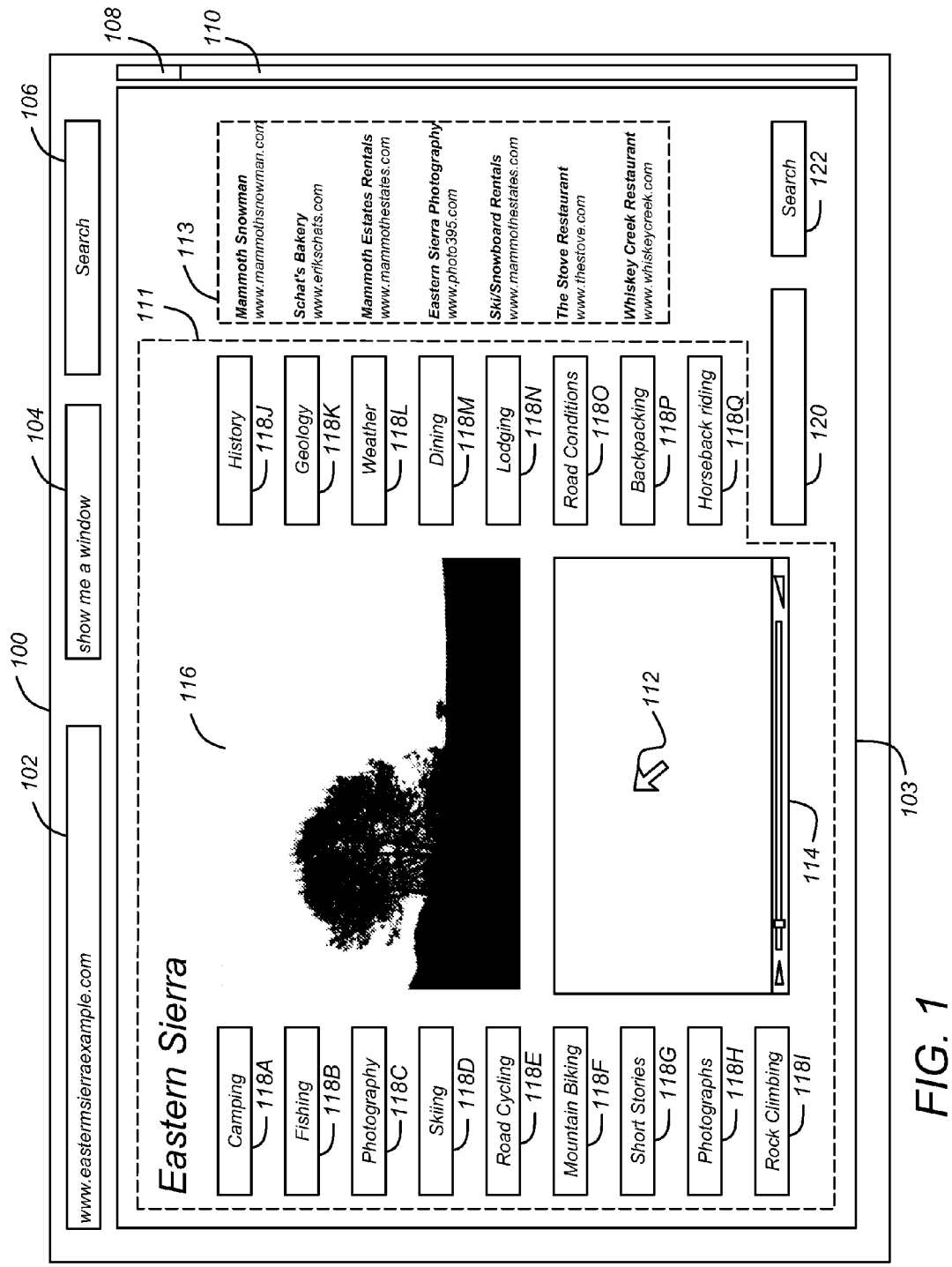
FIG. 1 is a diagram of an exemplary browser presenting a webpage.

FIG. 1 is a diagram of an exemplary browser 100 presenting an exemplary rendered webpage 103. A webpage 103 is an image manifested on a computer display, the contents of which is determined by executing a file that comprises source code (alternatively referred to hereinafter as "webpage source" or "webpage source code") that is typically expressed in a markup language such as HTML using a plurality of textural characters. When the source code is read and interpreted by the browser implemented on the computer (described further below), a browser 100 generates data which to presented the webpage on a display communicatively coupled to the computer.

In one embodiment, the webpage source code is a text file that comprises text describing content as well as commands that describe how the content is to be presented (e.g. by including one or more sets of HTML tags that describe how the text should be formatted when presented by the browser 100) and where the content may be obtained. The commands may also include commands for generating webpage controls that are used to activate certain webpage functionality. In the illustrated embodiment, the browser 100 includes an address input region 102, a search query input region 104, and a search button 100. The browser 100 may also include a scroll handle 108, which, by use of a mouse and associated pointer 112 can be selected and moved throughout the scroll region 110 to view a webpage 103 too large to depict in the browser 106 at one time.

When rendered, the webpage 103 may include a substantive content portion 111 and an advertising portion 113. The advertising portion 113 is used to present advertising to the user, and such advertising may or may not be relevant to the substantive content of the webpage 103. "Advertising" in this context, is defined as information that, for a fee or other compensation charged to the advertiser, is provided to potential customers regarding products or services that the potential customers may be interested in purchasing.

The substantive content portion 111 includes information directed solely to the subject matter of the webpage 103, and does not include advertising. Although illustrated as a contiguous portion, the substantive content portion 111 may comprise a plurality of separate portions in different locations in the webpage 103.

The rendered webpage 103 may also include plurality of controls 118A-118Q (hereinafter alternatively referred to as controls 118) related to categories of information, each of which is associated with the URL of another webpage that presents content related to the indicated category. The controls 118 are defined by appropriate commands in the webpage source.

The rendered webpage 103 may also include an embedded media player 114. The embedded media player 114 can be used to play media programs that are downloaded, streamed, or progressively downloaded from a host website (e.g. the website hosting the currently viewed webpage) or third party websites. This can be accomplished by including appropriate embedded media player 114 instructions into the webpage source. Typically, such instructions include a link to the URL of the media program in the webpage 103.

For example, if the user is interested in skiing, pointer 112 can be used to select control 118D, which will direct the browser 100 to the URL of another webpage providing content information about skiing.

Figure 2:
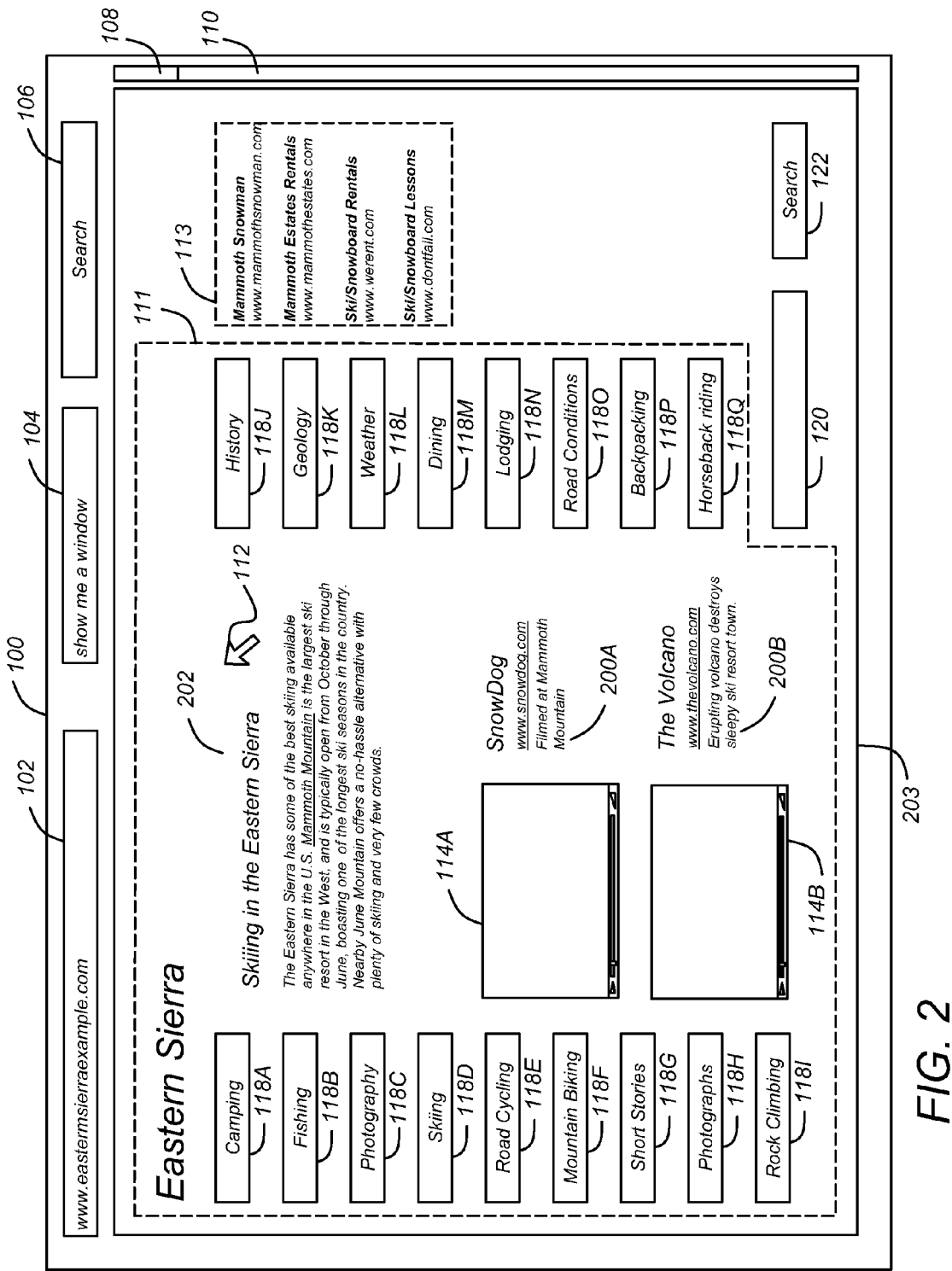
FIG. 2 is a diagram illustrating the webpage presenting a probable result from the selection of a control.

FIG. 2 is a diagram depicting an exemplary rendered webpage 203 after the user has selected control 118D. The substantive content section 111 has changed to present information about skiing in the Eastern Sierra, including text 202 and thumbnails 114A and 114B of media programs that are relevant to the information presented in the substantive content section 111. Links 200A and 200B to the media programs as well as other information may be provided.

Currently, to achieve these results, the embedded videos 114A and 114B and/or the links 200A and 200B are hard-coded in the webpage 203 source code. A difficulty with this solution is that if the link to either of the media programs is broken, a broken link will be displayed until new source is written for the webpage 203. Since links to media programs are often tenable, this requires the webmaster to verify that the status of the links to the media programs often and make adjustments as required. Another difficulty is that if new media programs are available, the webmaster will likewise need to update the webpage 203 source to present these new media programs.

The user may also search the website hosting the webpage 103 or the Web by entering information into an input box 120 and depressing search button 122. For example, if the user had entered "bass" as a search term and searched the website rather than the entire web, the rendered webpage 103 presented in FIG. 3 is a possible result.

In response to this query, the user is presented with a webpage 303 having a link to fishing stories 302, a link to where to fish for bass 304, and a link to a jazz festival 306. The user is also presented with thumbnails 114C and 114D and associated links 300C and 300D to media programs related to the search term "bass". In the illustrated embodiment, thumbnails and links to media programs about opening day (fishing) and the 2006 Jazz Festival are presented.

If the host desires to implement this functionality, the host of the webpage must undergo the trouble and expense of implementing their own search engine (an onerous task for a small website host) or use a search utility offered by a third party such as GOOGLE or YAHOO. This is typically accomplished by use of webpage source code supplied by the third party.

Figure 3:
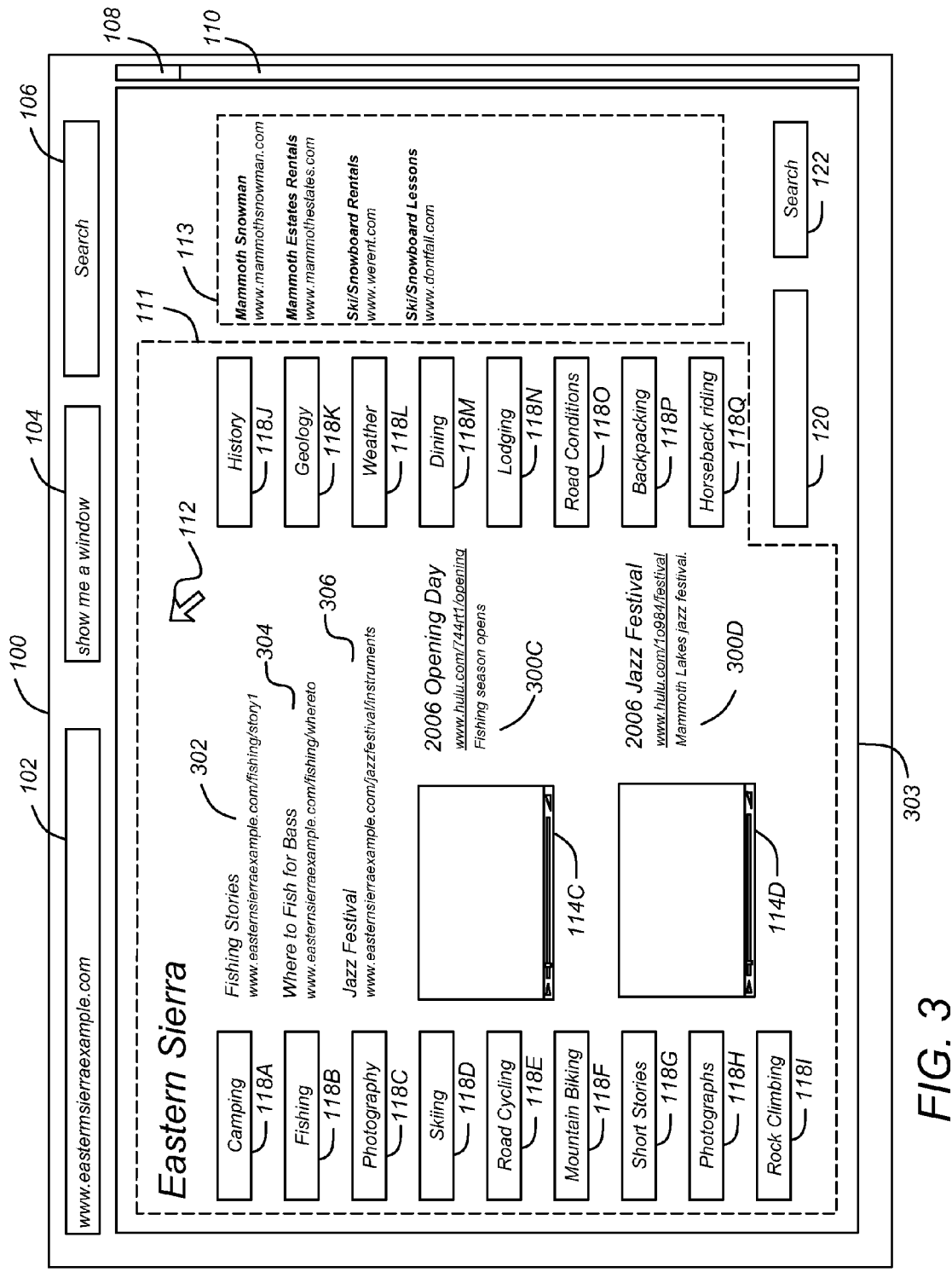
FIG. 3 is a diagram illustrating the webpage presenting a probable result from a search query.

While effective, third party search utilities typically do not present results in the same context as the website (for example, in the example shown in FIG. 3, the search result is presented to the user between the plurality of controls 118 and the webpage 303 has substantially the same appearance as it did before the search results were presented). Instead, such results are presented in a separate webpage with only the search results. The search result may also include thumbnails and links to media programs related to the search, but the search result is typically presented in a separate page hosted by an entity other than the host of the referring page, in a format and with an appearance determined by the search engine or the host of the search engine, and not by the referring webpage or host of the referring webpage. Hence, the search result will not have an appearance like that which is shown in FIG. 3, and the user will thereafter be more likely to explore other webpages from third parties (e.g. parties other than the host of the referring page . . . in the illustrated example, www.easternsierraexample.com). This can detrimental to the success of the success of the entity hosting the referring webpage.

Figure 4:
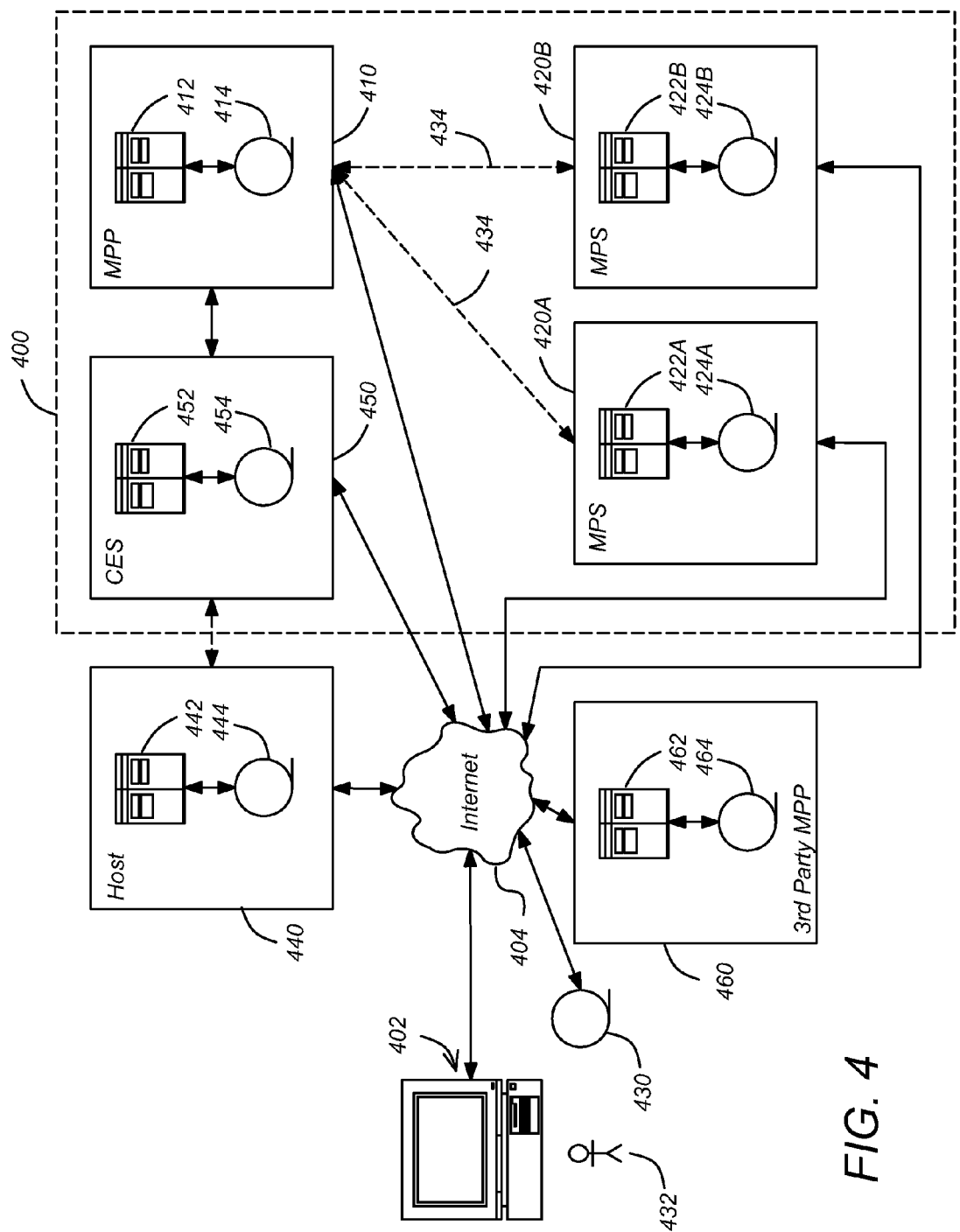
FIG. 4 is a diagram illustrating an exemplary media program system.

FIG. 4 is a diagram illustrating an exemplary media program system 400 and related elements. In the illustrated embodiment, the media program system 400 may comprise one or more media program sources (MPS) 420A, 420B, communicatively coupled to a communication network 404 such as the Internet and each having one or more source video servers 422A, 422B communicatively coupled to one or more source media program databases 424A, 424B. The media program system 400 further comprises a media program provider (MPP) 410, communicatively coupled to the communication network 404, and having one or more provider computers 412 and a provider media program database 414. The computers 412 can include one or more media servers, a web server, and any other processing elements necessary to perform the steps and functions described below. In one embodiment, the MPP 410 is a video-on-demand and/or streaming media program provider.

The media program may be provided by the MPP 410, or by a MPS 420, which may be a commercially separate entity from the MPP 410.

To provide the media program directly from the MPP 410 to the user computer 402, the MPP 410 licenses or purchases media programs from the media program sources 420 (such as www.fox.com or www.nbc.com). Typically, the MPS 420 also provides metadata for such programs. This metadata is typically adequate (e.g. it need not be supplemented by information from other sources) and can be stored and retrieved by the MPP database 414 for use.

When the media programs are provided directly from the MPS(s) 420 instead of the MPP 410, it is often the case that the metadata provided by the media program source 420 is insufficient. In such cases, supplementary metadata may be obtained from an independent media program source 430 (such as www.tv.com or www.imdb.com) or other third party sources. In this circumstance, the role of the media program provider 410 is that of a portal that provides users 432 a list of available media programs and an interface that allows the user to search for such programs and to view them.

Media programs and metadata may be obtained via the communication network 404 or through auxiliary (and/or dedicated) communication links 434 by webcrawling (for example, using a program or automated script that browses the World Wide Web in a methodical, automated manner).

Using the client computer 402, remote users 432 can communicate with the media program provider 410, to obtain media programs (including video-on-demand and/or streaming video services) and to search the provider media program database 414 to find media programs of interest.

Using the client computer 402, remote users 432 can also transmit and receive information from third party entities 440 communicatively coupled to the Internet. Such third party entities include, for example, search portals (e.g. www.yahoo.com or www.google.com) or servers hosting information such as commercial information or blogs. Hereinafter, servers hosing such information are alternately referred to as host servers. In either case, the third party entity 440 may include a server 442 and a database 444.

The media program system 400 may also include a content enhancement system 450 having a content enhancement server 452 communicatively coupled to an associated content enhancement database 454. As used herein, a "database" is an integrated collection of logically related records or files consolidated into a common pool, and may include a data collection searchable by an index.

The content enhancement system 450 transmits coded instructions to the third party entities 440 to be included in the webpages hosted by the third party entity 440 as further described below. The coded instructions may comprise a servlet, a snippet, an applet, a plurality of HTML instructions, or any other analogous code. When executed, these coded instructions provide a reference to media programs stored in the media program system 400 or hosted by third party media program providers 460 that are commercially separate from the media program system 400. The third party media program providers 460 may also include one or more servers 462 communicatively coupled to one or more databases 464.

Typically, the content enhancement system 450 and the media program provider 410 are commercially indistinct entities. The media program sources 420A, 420B are typically commercially distinct from the content enhancement system 450 and the media program provider 410. Third party host entity 440 is likewise typically commercially distinct from the media program provider 410 and the content enhancement system 450, but also commercially distinct from the media program sources 420A, 420B. Similarly, the third party media program provider 460 is typically commercially distinct from the media program provider 410 and the content enhancement system 450, as well as the media program providers 450A, 450B, and the third party host entity 440. However, the present invention may be practiced in embodiments where any of the foregoing elements are commercially indistinct or commercially distinct. As the term is used herein, a commercially distinct entity is one which is not partially or wholly owned by the other.

Figure 5:
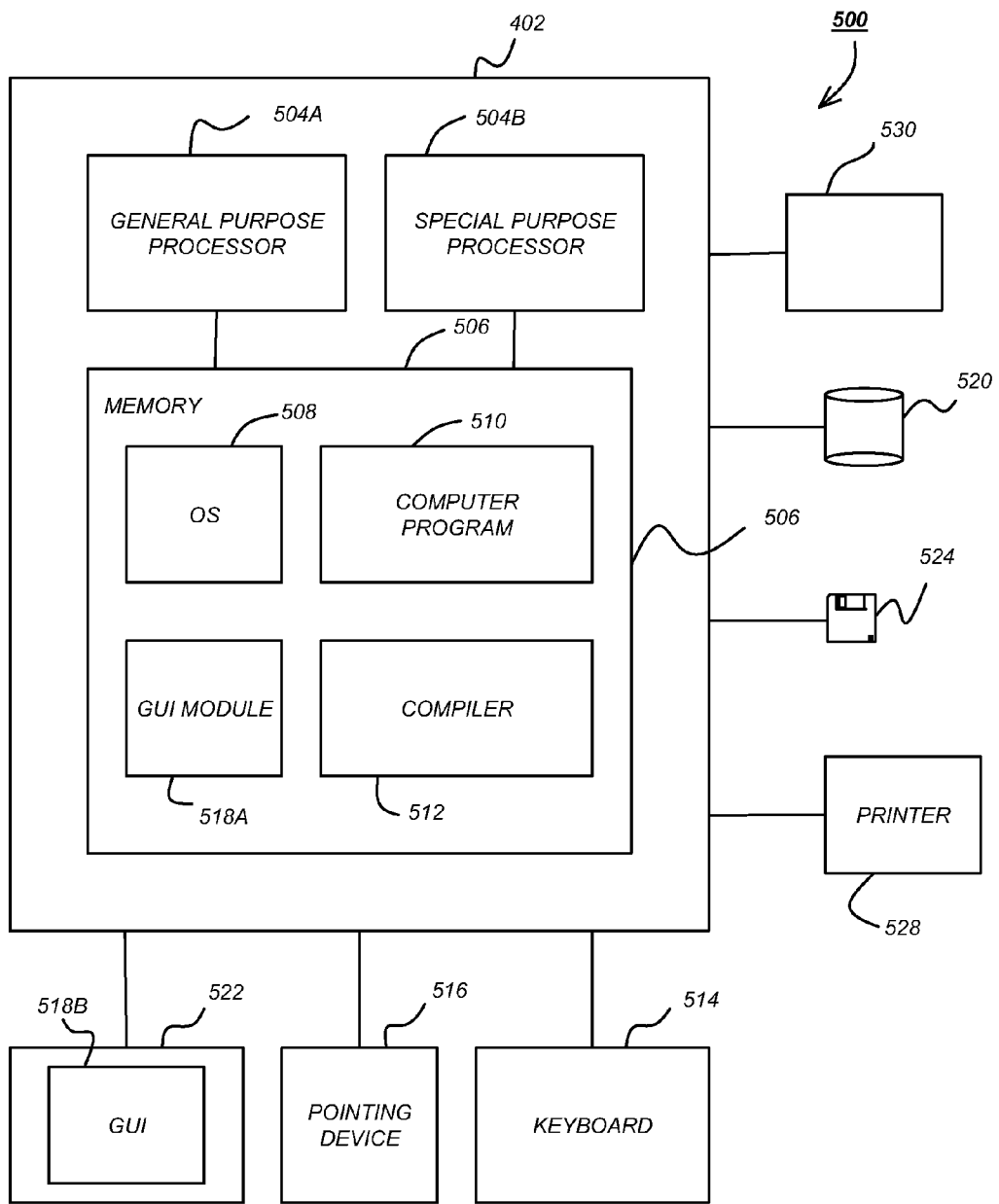
FIG. 5 is a diagram illustrating an exemplary computer system that could be used to implement elements of the present invention.

FIG. 5 is a diagram illustrating an exemplary computer system 500 that could be used to implement elements of the present invention, including the client computer 402, servers 412, 422, 442, 452 and 462 and the databases 414, 424, 444, 442 and 464. The computer 502 comprises a general purpose hardware processor 504A and/or a special purpose hardware processor 504B (hereinafter alternatively collectively referred to as processor 504) and a memory 506, such as random access memory (RAM). The computer 502 may be coupled to other devices, including input/output (I/O) devices such as a keyboard 514, a mouse device 516 and a printer 528.

In one embodiment, the computer 502 operates by the general purpose processor 504A performing instructions defined by the computer program 510 under control of an operating system 508. The computer program 510 and/or the operating system 508 may be stored in the memory 506 and may interface with the user 332 and/or other devices to accept input and commands and, based on such input and commands and the instructions defined by the computer program 510 and operating system 508 to provide output and results.

Output/results may be presented on the display 522 or provided to another device for presentation or further processing or action. In one embodiment, the display 522 comprises a liquid crystal display (LCD) having a plurality of separately addressable pixels formed by liquid crystals. Each pixel of the display 522 changes to an opaque or translucent state to form a part of the image on the display in response to the data or information generated by the processor 504 from the application of the instructions of the computer program 510 and/or operating system 508 to the input and commands. Other display 522 types also include picture elements that change state in order to create the image presented on the display 522. The image may be provided through a graphical user interface (GUI) module 518A. Although the GUI module 518A is depicted as a separate module, the instructions performing the GUI functions can be resident or distributed in the operating system 508, the computer program 510, or implemented with special purpose memory and processors.

Some or all of the operations performed by the computer 502 according to the computer program 310 instructions may be implemented in a special purpose processor 504B. In this embodiment, some or all of the computer program 510 instructions may be implemented via firmware instructions stored in a read only memory (ROM), a programmable read only memory (PROM) or flash memory within the special purpose processor 504B or in memory 506. The special purpose processor 504B may also be hardwired through circuit design to perform some or all of the operations to implement the present invention. Further, the special purpose processor 504B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 502 may also implement a compiler 512 which allows an application program 510 written in a programming language such as COBOL, C++, FORTRAN, or other language to be translated into processor 504 readable code. After completion, the application or computer program 510 accesses and manipulates data accepted from I/O devices and stored in the memory 506 of the computer 502 using the relationships and logic that was generated using the compiler 512.

The computer 502 also optionally comprises an external communication device such as a modem, satellite link, Ethernet card, or other device for accepting input from and providing output to other computers.

In one embodiment, instructions implementing the operating system 508, the computer program 510, and/or the compiler 512 are tangibly embodied in a computer-readable medium, e.g., data storage device 520, which could include one or more fixed or removable data storage devices, such as a zip drive, floppy disc drive 524, hard drive, CD-ROM drive, tape drive, or a flash drive. Further, the operating system 508 and the computer program 510 are comprised of computer program instructions which, when accessed, read and executed by the computer 502, causes the computer 502 to perform the steps necessary to implement and/or use the present invention or to load the program of instructions into a memory, thus creating a special purpose data structure causing the computer to operate as a specially programmed computer executing the method steps described herein. Computer program 510 and/or operating instructions may also be tangibly embodied in memory 506 and/or data communications devices 530, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 502.

Although the term "computer" is referred to herein, it is understood that the computer may include portable devices such as cellphones, portable MP3 players, video game consoles, notebook computers, pocket computers, or any other device with suitable processing, communication, and input/output capability.

Figure 6A:
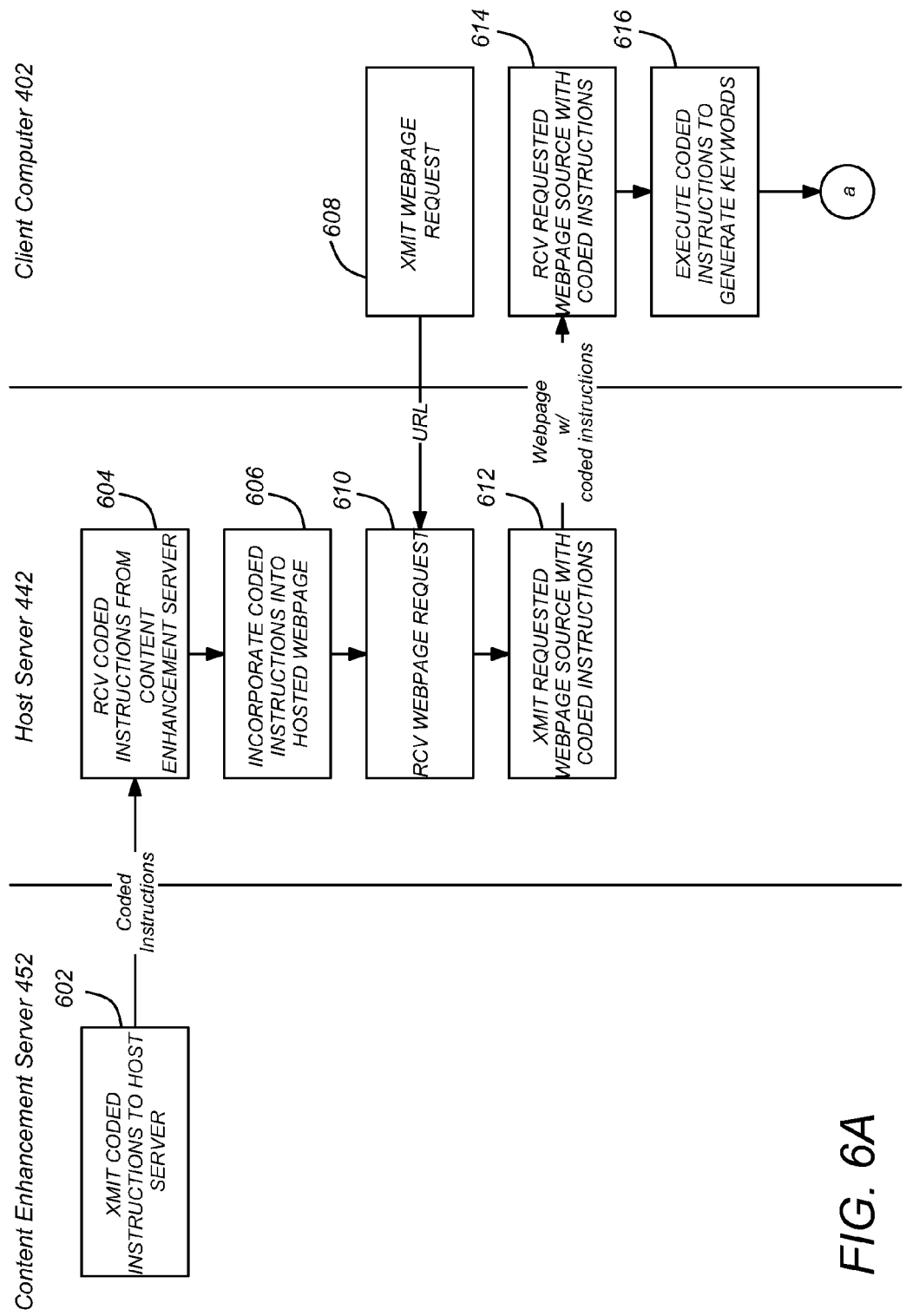
FIGS. 6A and 6B are diagrams illustrating exemplary operations that can be used to provide supplemental video content in a webpage hosted by a host server to a client computer.
Figure 6B:
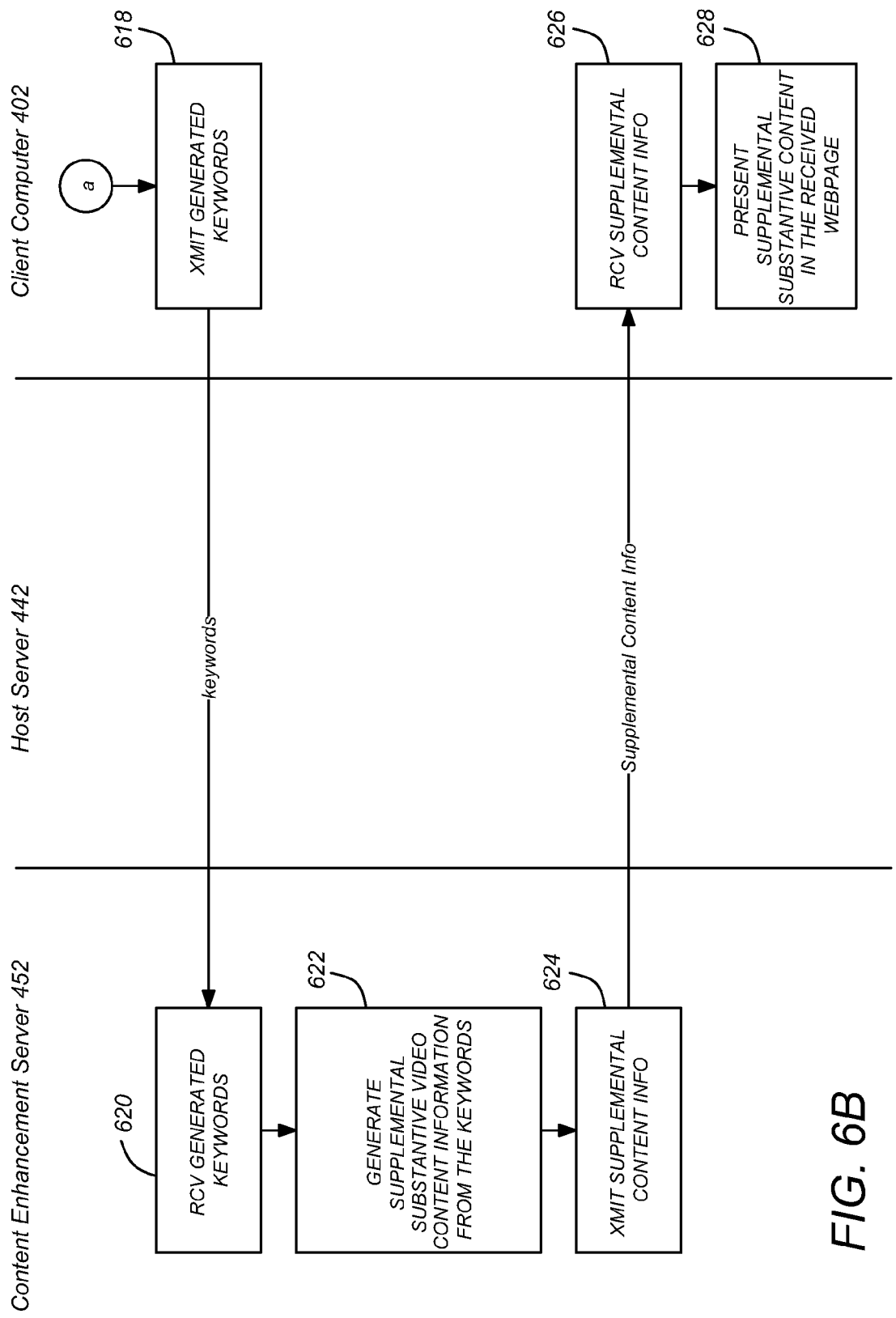

FIGS. 6A and 6B are diagrams illustrating exemplary operations that can be used to provide supplemental video content in a webpage hosted by a host server 460 to a client computer 402. Coded instructions are transmitted from the content enhancement server 452 to the host server 442, as shown in block 602. The host server 442 hosts webpages such as webpages 103, 203 and 303 illustrated in FIGS. 1-3. In one embodiment, the coded instructions are written in hypertext markup language (HTML), but other languages and expressions such as XML may be used. The coded instructions may be transmitted via the Internet 404 or by any other means, including transmission via sneakernet (e.g. transmission via a tangible data storage device such as a DVD, flash drive or floppy disk).

The coded instructions are received in the host server 442 and incorporated into the source of a webpage hosted by the host server 442, as shown in blocks 604 and 606.

In block 608, the client computer 402 transmits webpage request to the host server 442. This can be accomplished by entering the uniform resource locator (URL) of the desired webpage in the address input region 102, but may also involve the selection of a hyperlink associated with the URL of the desired webpage.

In block 610, the host server 442 receives a request for the webpage with the coded instructions. In block 612, the host server 442 transmits the webpage source to the client computer 402. As described herein, the webpage source includes data, which, when read and executed by a browser executed by the client computer 402 provide data to the display 522 to render the requested webpage. The transmitted webpage source also includes the incorporated coded instructions that are received by the client computer 402 and executed to generate keywords, as shown in blocks 614 and 616.

Figure 7:
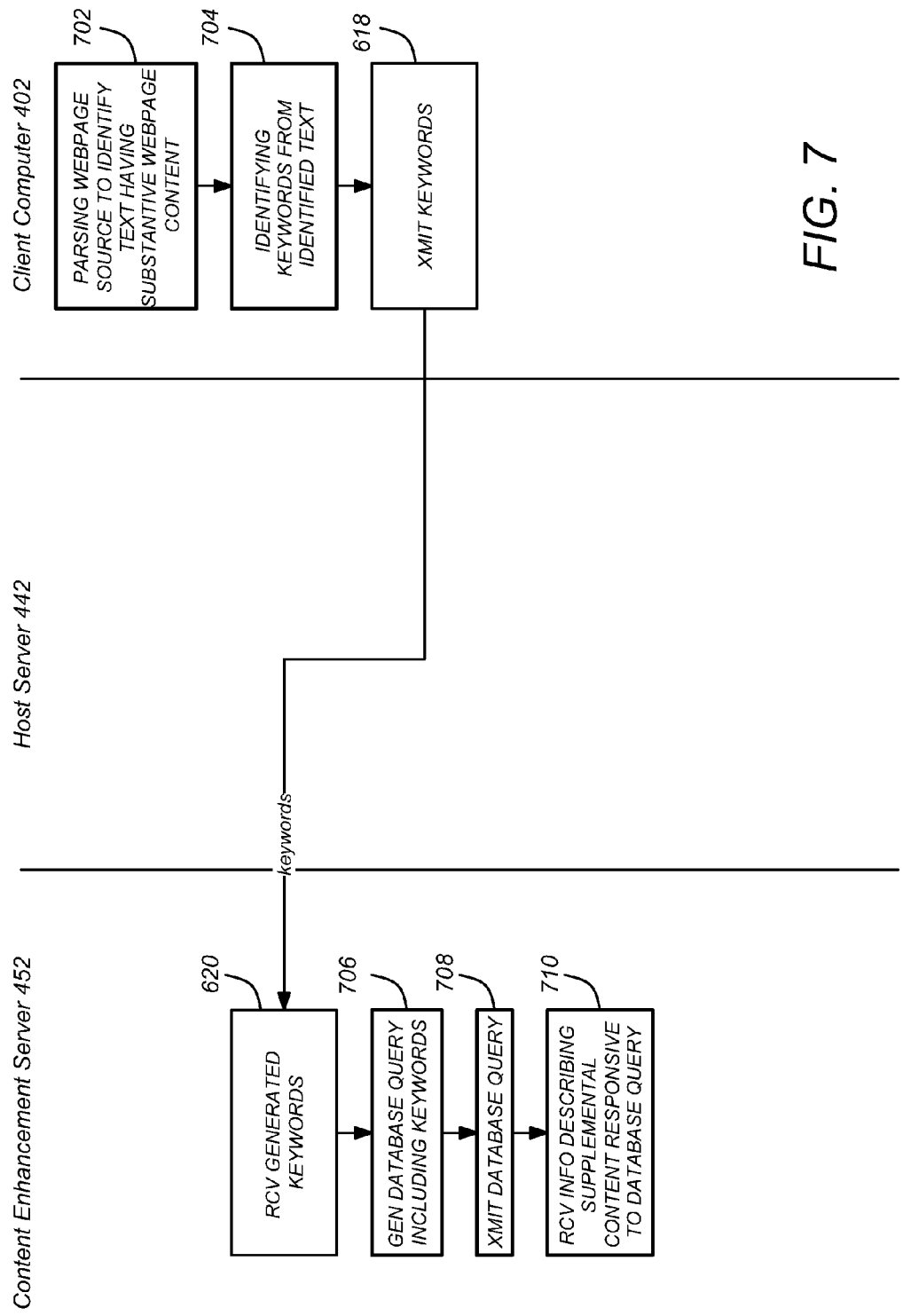
FIG. 7 is a diagram illustrating exemplary operations that can be performed to generate keywords and generate supplemental substantive webpage content from the keywords.

FIG. 7 is a diagram illustrating exemplary operations that can be performed to generate the keywords described in block 616 and to generate supplemental substantive content from the keywords. In block 702, the webpage source is parsed to identify text having substantive webpage content. Parsing involves analyzing the content in appropriately sized elements to break down words into functional units that can be identified as grammar, content, or other elements. For example, the parsing of the statement SUM SALARY FOR TITLE="MANAGER" may identify SUM as a primary command, FOR as a conditional search, TITLE as a field name, and MANAGER as the data to be searched.

Items that begin with "www." or http://www." can be easily identified as referring to weblinks by the parsing process as well. Such weblinks can be the URL to a second webpage that may include or refer to additional supplemental substantive content. In one embodiment, the content enhancement server accesses the second webpage using the URL, and examines the source of the second webpage to generate further keywords that can be used to identify further supplemental substantive webpage content.

FIG. 8 is a diagram showing exemplary webpage source code 800 for a blog. The source code 800 includes substantive content 802 which may include text or an embedded video player that may be presented in the blog.

Referring back to FIG. 7, the webpage source code is parsed to identify text having substantive webpage content, for example, the substantive content 802 presented in FIG. 8. Other content, such as text included with URLs and the like, can also be identified as substantive content. For example, if the source code includes a reference to a photograph at the URL www.photostorageforfree.com/member23934/Mt_Whitney.jpg, then "Mt_Whitney" can be identified as substantive content. Further, if the source code includes a reference to a video at the URL www.photostorageforfree.com/member23934/skiing_mammoth_mountain.flv, "skiing" and "mammoth" can be identified as substantive content, and a search for supplemental substantive content based on these keywords can be performed. In one embodiment, the identification of substantive content is performed by essentially identifying what is not substantive content (e.g. text that is known to be used for formatting or other purposes unrelated to content) and identify the remainder as "substantive." Substantive content can also be identified by placing identified words into categories, identifying categories having the greatest number of words as relevant categories, then identifying the words in these relevant categories as being substantive content. This technique helps identify the topic of the webpage and to focus the inquiry as to what is "substantive content" to those words which are on topic.

Content may also be ranked in the same manner in terms of relevancy. For example, if there are many occurrences of words categorized as being related to fishing (e.g. "fish," "trout," "bait") and few related to automobiles (e.g. "car," "truck," "drive"), content may be prioritized accordingly (with the fishing category given higher priority when generating supplemental content than automobiles).

Next, as shown in block 704, keywords are identified or generated from the identified text. In one embodiment, this is accomplished by eliminating prepositions such as "from" and "to" and other words which are unlikely to have substantive content. Further, multiple instances of words with common roots (e.g. bikes, bike) or synonyms (bikes, bicycles) can be identified an consolidated.

As shown in FIGS. 6B and 7, the keywords are transmitted to the content enhancement server 452, as shown in block 618. This can be accomplished via the Internet 404 or by the public switched telephone network (PSTN) or by other means. The keywords are received, and used to generate supplemental substantive video content information, as shown in blocks 620 and 622.

FIG. 7 further illustrates how supplemental substantive video content information can be generated from the keywords. A database query is generated that includes one or more of the keywords, as shown in block 706. The database query is transmitted to a database as shown in block 708. The database may be local to the content enhancement server 452 (e.g. content enhancement database 454), or may be remote to the content enhancement server 452 (e.g. databases 424 or third party databases). The database 454 may also be implemented by a search index. The content enhancement server 452 receives the supplemental substantive video content information (information describing video content supplementing the substantive content on the webpage, as determined by the keywords), as shown in block 710 from the database. The database of supplemental substantive content information can be populated by periodic webcrawling or similar techniques. The supplemental content information can include, for example, websites, videos, photos, text, further coded instructions, and other information related to the keywords received from the client computer.

Turning to FIG. 6B, the supplemental substantive content information is transmitted from the content enhancement server 452 to the client computer 402, as shown in block 624. The client computer 402 receives the supplemental content information and uses the supplemental substantive content information to present supplemental substantive video content to the user 432, in the webpage. as shown in blocks 626 and 628. Supplemental substantive video content information can include, for example, links (e.g. URLs) to video content supplementing the substantive content of the webpage, thumbnails of such supplemental substantive video content, or embedded videos, photos (e.g. *.jpg files) that supplement the substantive content of the webpage.

Figure 10:
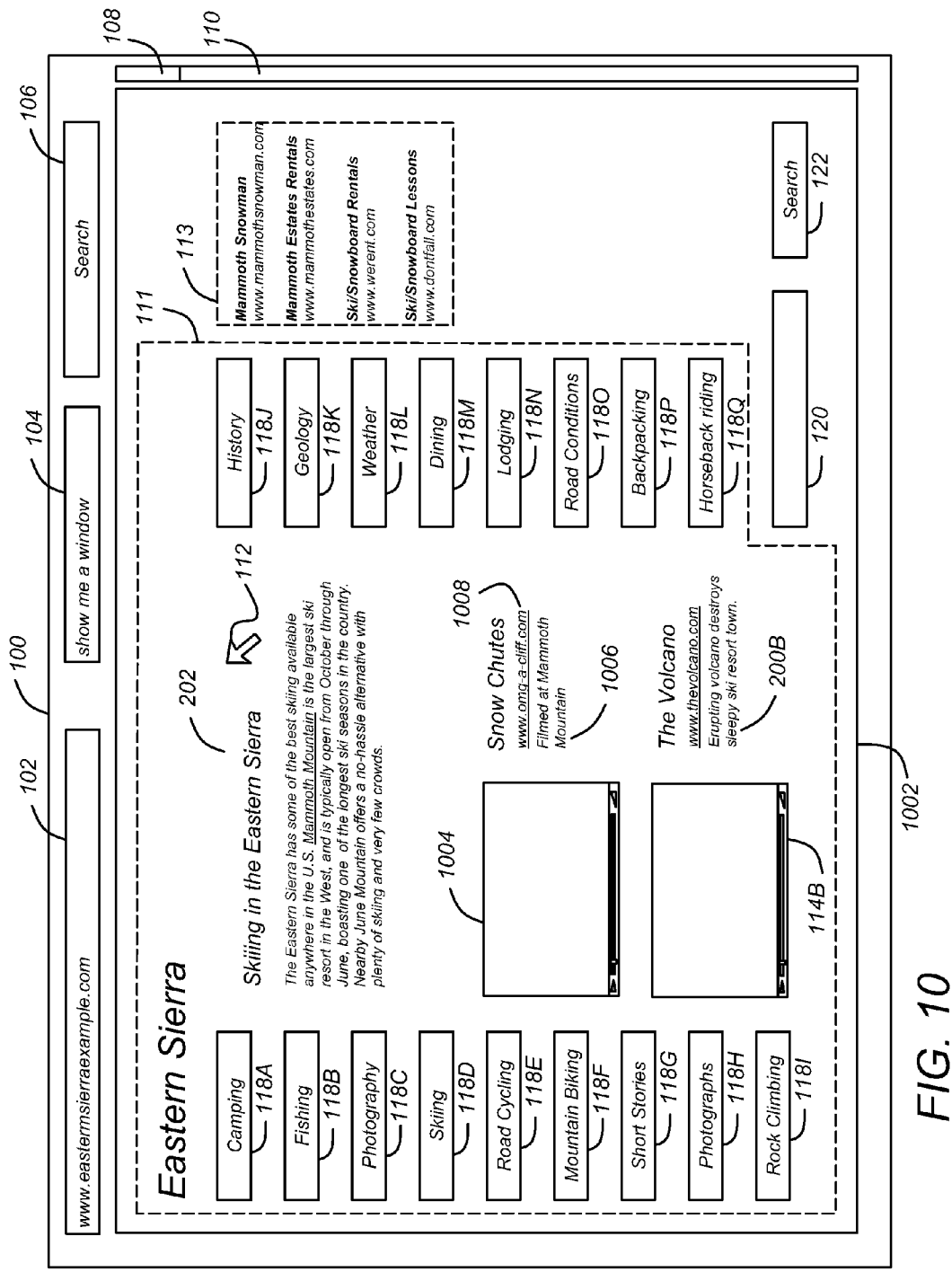
FIG. 10 is a diagram of an exemplary rendered webpage using the operations described in FIGS. 6A and 6B.

As described above, the supplemental substantive content may include a link to the address or URL of a supplemental video, such as item 1008 in FIG. 10. The client computer 402 may accept a selection of the link and thereafter, present the supplemental video to the user 432 on the display 522.

FIG. 9 is a diagram presenting webpage source code modified to include an embedded video. The source code includes coded instructions 902 such as a web widget that commands the reception of relevant content on the "eastern-sierra-skiing" block from the CES 450. The instructions 902 need not target a specific portion of the webpage (e.g. the "targetContent" attribute can be removed) because the widget could analyze the entire page and determine what the relevant bits are. This embodiment is particularly useful to the host 440, because the host need not target the widget at a portion of the webpage. The resulting webpage is then rendered by the client computer 402 and presented to the user in a browser 100 on the display 522.

FIG. 10 is a diagram of an exemplary rendered webpage 1002. In the exemplary webpage 1002 shown in FIG. 10, the supplemental substantive content included an embedded video 114B or thumbnail for an embedded video entitled "The Volcano," thus presenting an analogous result to that shown the webpage 203 shown in FIG. 2. However, in the instant case, the search for supplemental video content using the keywords provided by the client computer 402 yielded information regarding a movie entitled "Snow Chutes." Such information may be provided in the webpage as a thumbnail to of the "Snow Chutes" movie, an embedded video of the "Snow Chutes" movie 1004, and/or a hyperlink to a URL where the "Snow Chutes" movie may be accessed.

In some circumstances, it is desirable to provide tools to the webpage designer or host of the webpage that allow control over which supplemental content is presented. This may be desirable, for example, if the host website is one which is directed to small children, and the webpage designer or host would like to assure that any supplementary information is age appropriate. The webpage designer or host may also want to eliminate certain supplemental content because that supplemental content is deemed to be contrary to the purpose of the webpage or may lure readers to a different webpage. Accordingly, in one embodiment, the coded instructions provided to the host server includes a unique identifier that identifies the host server. When the keywords are transmitted from the client computer to the content enhancement server 450, the instructions also transmit the identifier as well, allowing the content enhancement server 450 to identify the host server 440. Using this identifier, the content enhancement server can identify the host server, determine the supplemental substantive content preferences of the home server from the identity, and alter the supplemental substantive content information according to the host server's preferences.

This can also be accomplished, for example, by providing the webpage designer or host an interface to the content enhancement server 450 that allows the webpage designer or host to tailor the search results to include supplemental substantive content of interest and exclude supplemental substantive content that is not of interest. In one embodiment, this is implemented by the content enhancement server 452 hosting a webpage having a secure login. Once the webmaster of the host server 442 logs in, a webpage is presented offering the webmaster a plurality of options regarding the substantive content information to be provided to the host server's clients. Such options may include a rating of the supplemental content, an interface to supply additional keywords related by Boolean operators (e.g. do not present supplemental substantive content if particular words or word combinations are present, or if the supplemental substantive content is from a particular source, specified, for example, by the URL of the source).

This functionality can also be implemented in the coded instructions transmitted to the host server 442. In this embodiment, the webmaster of the host server 442 may use these coded instructions to log in to the content enhancement server and specify supplemental substantive video content information preferences, but instead of enforcing such preferences in responding to the identifier and keywords received from the client computer, this embodiment generates the coded instructions based on such preferences. Accordingly, after parsing the webpage source code to identify keywords, the coded instructions include instructions for ignoring or deleting key words that are inconsistent with the preferences provided by the host server's webmaster.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for presenting a search utility in an embedded video player application, comprising:
configuring coded instructions for embedding into webpage source code, the coded instructions comprising a link to a media player application on a content enhancement server and executable for identifying keywords based on the webpage source code, wherein the webpage source code further comprises a link to a second webpage;
transmitting the coded instructions from the content enhancement server to a host server;
receiving the coded instructions from the content enhancement server in the host server;
incorporating the coded instructions including the link to the media player application in the webpage stored in the host server;
receiving keywords via a computer network, the keywords generated by execution of the coded instructions in the webpage received by a client computer from the host server;
generating supplemental substantive video content information from the keywords in the content enhancement server, the supplemental substantive video content information identifying video content supplementing the substantive content of the webpage;
transmitting the supplemental substantive video content information from the content enhancement server to the client computer configured for producing video output of the video content by the media player application executing on the client computer;
executing the coded instructions in the client computer to generate keywords describing the substantive content of the webpage by parsing the webpage source code to identify substantive webpage content;
parsing the webpage source code to identify the link to the second webpage;
accessing the second webpage, the second webpage having second webpage substantive webpage content; and
further generating the keywords from the second webpage substantive webpage content.

2. The method of claim 1, further comprising:
receiving a first message from the client computer, the message comprising a uniform resource locator (URL) for the webpage; and
transmitting the webpage to the client computer.

3. The method of claim 2, further comprising
transmitting the keywords to the content enhancement server.

4. The method of claim 1, wherein
generating supplemental substantive video content information from the keywords further comprises:
generating a database query including the keywords;
transmitting the database query to a database associating video content with metadata; and
receiving the supplemental substantive video content information responsive to the database query.

5. The method of claim 1, wherein the supplemental substantive video content information comprises an address to a supplemental video.

6. The method of claim 5, further comprising:
presenting the webpage comprising a link to the address of the supplemental video on a display communicatively coupled to the client computer;

accepting a selection of the link in the client computer; and
presenting the supplemental video to the user on a display communicatively coupled to the client computer.

7. The method of claim 1, wherein the coded instructions are selected from the group comprising: a servlet; a snippet; and an applet.

8. A system for presenting a search utility in an embedded video player application, comprising:
a content enhancement server, having a content enhancement processor and a content enhancement server memory storing content enhancement instructions including instructions for:
configuring coded instructions for embedding into webpage source code, the coded instructions comprising a link to a media player application on a content enhancement server and executable for identifying keywords based on the webpage source code, wherein the webpage source code comprises a link to a second webpage and the coded instructions when executed by the client computer generate keywords describing the substantive content of the webpage by parsing the webpage source code to identify substantive webpage content, parse the webpage source code to identify the link to the second webpage, open the second webpage having second webpage substantive webpage content, and further generate the keywords from the second webpage substantive webpage content;
transmitting the coded instructions from the content enhancement server to a host server;
receiving keywords via a computer network, the keywords generated by execution of the coded instructions in the webpage received by a client computer from the host server;
generating supplemental substantive video content information from the keywords in the content enhancement server, the supplemental substantive video content information identifying video content supplementing the substantive content of the webpage;
transmitting the supplemental substantive video content information from the content enhancement server to the client computer configured for producing video output by the media player application executing on the client computer; and
the host server, comprising a host server memory storing host server instructions including instructions for:
receiving the coded instructions from the content enhancement server in the host server, and incorporating the coded instructions including the link to the media player application in the webpage stored in the host server.

9. The system of claim 8, wherein: the host server instructions further include instructions for:
receiving a first message from the client computer, the message comprising a uniform resource locator (URL) for the webpage; and
transmitting the webpage to the client computer.

10. The system of claim 9, wherein the coded instructions further comprise instructions for transmitting the keywords to the content enhancement server.

11. The system of claim 8, wherein the coded instructions include instructions for:
parsing the webpage source code to identify text having substantive webpage content; and
identifying the keywords from the identified text.

12. The system of claim 8, wherein the supplemental substantive video content information comprises an address to a supplemental video.

13. The system of claim 12, wherein the client computer further comprises a memory storing client computer instructions comprising instructions for:
presenting the webpage comprising a link to the address of the supplemental video on a display communicatively coupled to the client computer;
accepting a selection of the link in the client computer; and
presenting the supplemental video to the user on a display communicatively coupled to the client computer.

14. The system of claim 8, wherein the coded instructions are selected from the group comprising: a servlet; a snippet; and an applet.

15. A computer readable storage device, tangibly embodying at least one program of instructions which when accessed by a computer cause the computer to load the program instructions to a memory therein creating a special purpose data structure causing the computer to operate as a specially programmed computer, executing a method for presenting a search utility in an embedded video player application, comprising instructions for:
configuring coded instructions for embedding into webpage source code, the coded instructions comprising a link to a media player application on a content enhancement server and executable for identifying keywords based on the webpage source code, wherein the webpage source code comprises a link to a second webpage and the coded instructions when executed by the client computer generate keywords describing the substantive content of the webpage by parsing the webpage source code to identify substantive webpage content, parse the webpage source code to identify the link to the second webpage, open the second webpage having second webpage substantive webpage content, and further generate the keywords from the second webpage substantive webpage content;
transmitting the coded instructions from the content enhancement server to a host server;
receiving keywords via a computer network, the keywords generated by execution of the coded instructions in the webpage received by a client computer from the host server;
generating supplemental substantive video content information from the keywords in the content enhancement server, the supplemental substantive video content information identifying video content supplementing the substantive content of the webpage; and
transmitting the supplemental substantive video content information from the content enhancement server to the client computer configured for producing video output of the video content by the media player application executing on the client computer.

* * * * *